Jan. 23, 1968      S. L. ZEDEKAR      3,365,248

MAGNETIC BEARING LOADING

Filed July 1, 1964      3 Sheets-Sheet 1

INVENTOR.
STANLEY L. ZEDEKAR
BY
ATTORNEY

INVENTOR.
STANLEY L. ZEDEKAR

ATTORNEY

*INVENTOR.*
STANLEY L. ZEDEKAR
BY
ATTORNEY

United States Patent Office 3,365,248
Patented Jan. 23, 1968

3,365,248
MAGNETIC BEARING LOADING
Stanley L. Zedekar, Costa Mesa, Calif., assignor to North American Rockwell Corporation, a corporation of Delaware
Filed July 1, 1964, Ser. No. 379,667
4 Claims. (Cl. 308—10)

This invention relates in general to bearing structures and more particularly it relates to the loading of bearings of the gas-lubricated, hydrodynamic type and to the method for raising the onset of half-frequency whirl in this type of bearings.

Gas-lubricated journal bearings are finding wide spread application in industry due to many attractive features, such as low and constant friction, no contamination from lubricants, high reliability, and infinite life under constant operation. The steady state operation of a plane gas journal bearing is particularly easy to predict. Unfortunately, under actual operation this steady-state condition is frequently never reached due to the bearing becoming unstable. This instability appears as a whirling of the bearing shaft with a rapidly increasing amplitude and with subsequent destruction to the bearing. This whirling instability occurs at slightly less than half the rotor speed and hence is called "half-frequency whirl." This instability is by far the most common cause of bearing failure. Numerous attempts have been made to raise the onset (the frequency at which it occurs) of this instability. The most effective method tried to-date has been to increase the loading on the bearing. Efforts in the present state-of-the-art are to increase the rotor weight and thereby the loading on the bearing. This method requires a fixed orientation of the bearing with respect to gravity and of course the presence of gravity. In space, or in inertial instruments, this method would be useless due to the absence of gravity or to the changing orientation of the bearing with respect to gravity. Other methods of increasing the loading are by ingenious variations in bearing geometry, such as various grooves in the bearing itself. All of these are extremely difficult to fabricate. More important is that most of these schemes markedly reduced the load carrying capacity of the bearing. The present invention applies an external, radial magnetic force to the rotating member of the bearing such as the shaft or rotor. The method of obtaining, and the placement of, the magnetic force is dictated by the particular application. In one embodiment, to stabilize the bearings being used in a hysteresis synchronous motor, the method of obtaining the magnetic force is to eccentrically mount the rotor with respect to the stator, thereby changing the distribution of radial magnetic force applied to the rotor so that a component of the magnetic force is used to off-center the rotor shafts in their respective bearings. The amount of the radial force necessary to stabilize the bearing can be readily predicted using: Ausman, J. S., "Linearized pH Stability Theory for Translatory Half-Speed Whirl of Long, Self-Acting, Gas-Lubricated Journal Bearings," ASME Paper No. 62–WA–195 (Revised), dated Aug. 9, 1962.

Accordingly, the principal object of this invention is to provide a bearing structure for high speed applications in which the onset of half-frequency whirl is raised above the operating frequency of the bearing.

Another object of this invention is to provide a method of loading a gas-lubricated bearing which is both simple and inexpensive.

Still another object of this invention is to provide a means whereby a gas-lubricated, hydrodynamic journal, bearing may be used efficiently in space.

These and other objects of this invention will become apparent from the following description taken in conjunction with the accompanying drawings in which.

Figure 1:
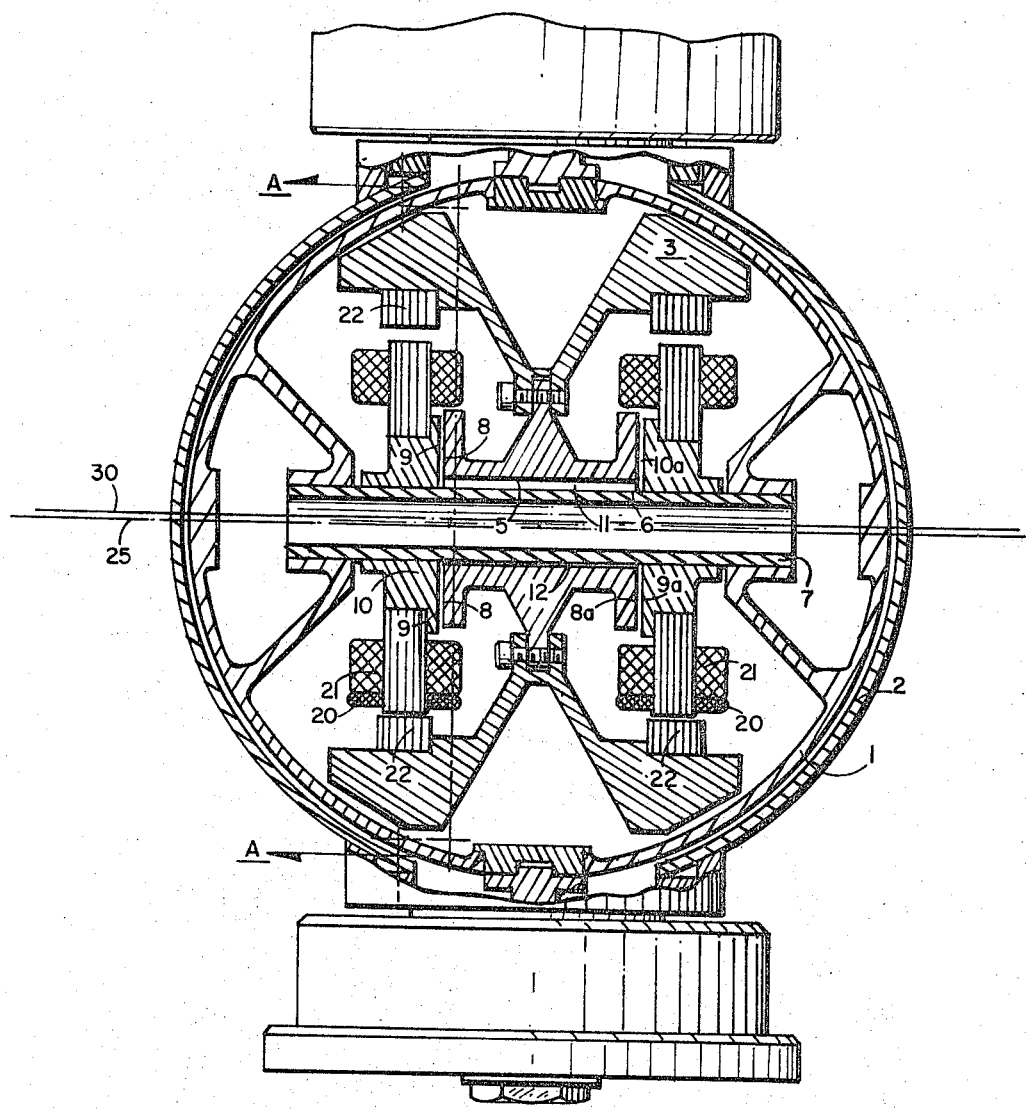
FIG. 1 illustrates a sectional view of a gas bearing gyroscope utilizing one embodiment of the present invention.

Referring to FIG. 1, the invention is illustrated as a part of a gyroscope, but it will be readily understood by those skilled in the art that this invention may be applied to many other forms of gas lubricated bearings. A gyroscope with rotor 3 and stator frame 1 is mounted inside an outer housing 2. Rotor 3 is supported by a spool 4 having a radial bearing surface 5 fitted to rotate on the radial bearing surface 6 of shaft 7. In the gap, between bearing surfaces 5 and 6, an auto lubricated radial spin gas bearing action occurs during operation of the gyroscope. During rotation, thrusting surfaces 8 and 8a on spool 4 are separated by gaps with clearances ranging between 100 and 200 micro inches from thrust bearing surfaces 9 and 9a, respectively. Bearing surfaces 9 and 9a are on end plates 10 and 10a, respectively. An auto lubricated gas thrust bearing action occurs in the above gaps. Mounted to rotor 4 and extending around the inner circumference thereof is the laminated rotor cores 22. Mounted to shaft 7 by members 10 and 10a are a plurality of substantially similar stator electro magnetic driving coils 21. Additional electro magnetic coils 20 are mounted to the stator at predetermined points to effectively increase the magnetic attraction between the rotor 3 and the stator's additional coils 20 to cause the center 30 of the rotor 3 to be displaced a predetermined distance from the center 25 of the stator structure 1. By off-setting the rotational center of the rotor with respect to the center of the stator structure 1 the bearing gaps 11 and 12 are made unequal thereby causing the pressure exerted on these two points to be unequal. To explain more specifically: the magnetic loading effects a change in the clearance between bearing surfaces 5 and 6 at points 11 and 12. This change in clearance results in a resistance change to the flow of gas between points 11 and 12. Where the clearance is relatively large, such as it is at point 11, the gas may escape rapidly with relatively little resistance. Where the clearance is small, such as it is at point 12, the flow resistance is very high, thus holding back the gas and developing a high pressure at this region. This unequal pressure or force acting on the rotor 3 loads the bearing to stabilize and prevent movement of the rotor in any plane substantially perpendicular to the rotational axes of the rotor, which in turn raises the onset of half-frequency whirl in the bearing.

Coils 20 are shown as separate coils placed adjacent to a pair of coils 21, but the same effect may be had by increasing the number of turns on the above mentioned coils 21. The net result being an increased magnetic loading force. The particular application of the bearing will dictate the point of application of the magnetic loading force. If for example, the bearing is to be used in a fairly fixed orientation with respect to gravity, the magnetic force should be applied to aid gravity. In other applications it may be necessary to empirically find the best location for the magnetic loading force.

A more detailed description of a gas bearing which may be used with the present invention is described in United States Patent No. 3,048,043 entitled "Gas Bearing," by J. M. Slater et al.

Figure 2:
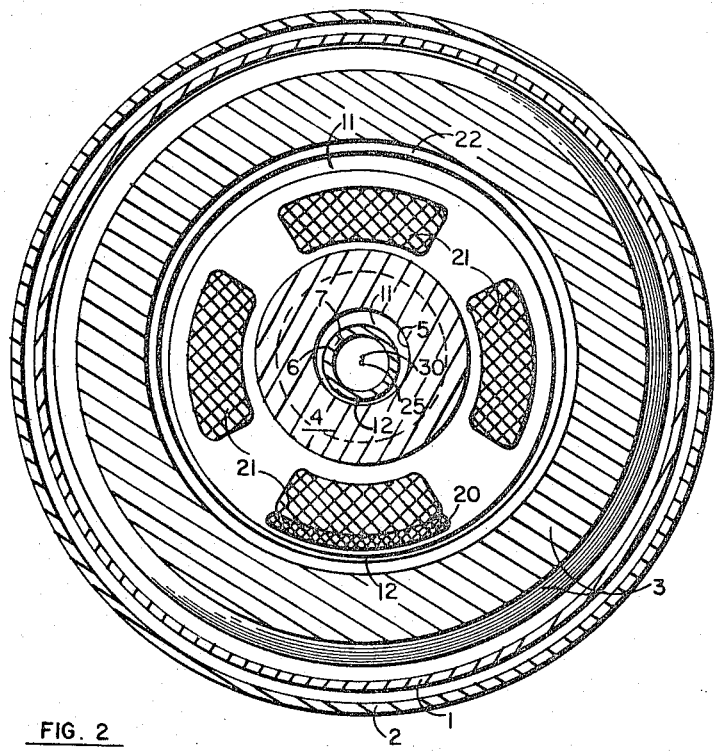
FIG. 2 is a cross-sectional view of the device illustrated in FIG. 1 taken at section A–A'.

FIG. 2 shows a cross-sectional view taken at A—A which more clearly shows the eccentric placement of the rotor center 30 with respect to the stator center 25. The electro magnets 21 are shown symmetrically mounted about the bearing surface 6 to transmit a rotational driving force to rotor 3. An additional magnet 20 is shown placed adjacent to one of the electro magnets 21.

In operation electro magnets 20 during the start phase are not energized. A conventional hysteresis synchronous motor action takes place between the electro magnets 21 comprising the stator and between the rotor 3. As rotor 3 is brought up to speed, the spacing between bearing surfaces 5 and 6 at points 11 and 12 tends to equalize. Before the occurrence of half-frequency whirl, coil 20 is energized causing a displaceable force to be applied to rotor 3 effectively causing the rotor center 30 to be off-set from the stator center 25. The gaps 11 and 12 therefore become unequal causing the pressure exerted on the bearing surfaces 5 and 6 at these points to become unequal which in turn causes the resultant force which loads the bearing. Coil 20 may remain energized during the start phase if desired, but the additional loading during this critical phase of gas bearing operation may cause wearing of the bearing surfaces resulting in a shorter life span.

Figure 3:
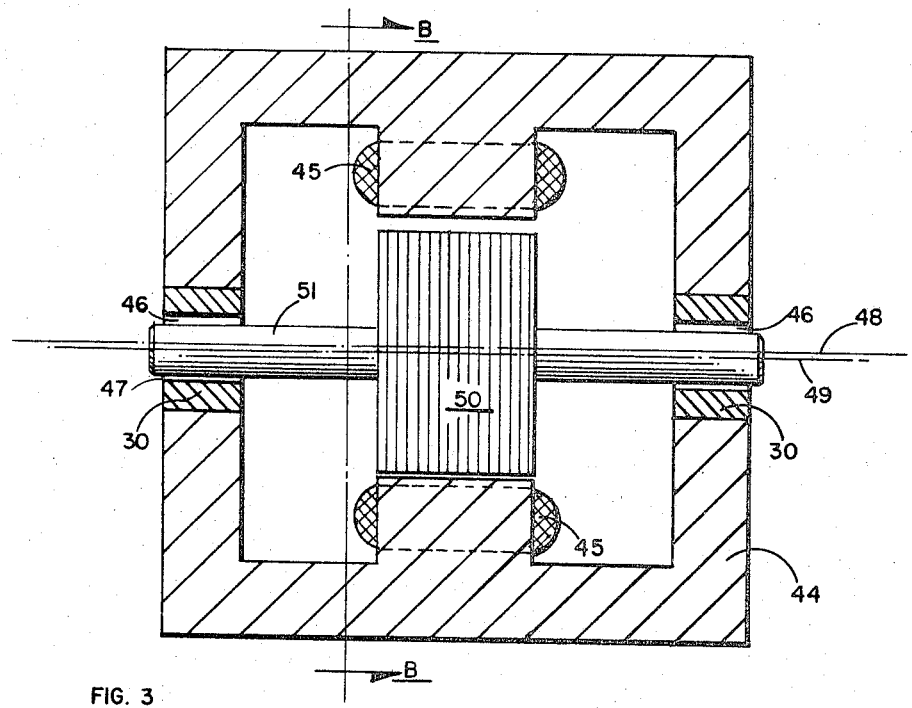
FIG. 3 is a sectional view of a gas bearing illustrating a second embodiment of the present invention.
Figure 4:
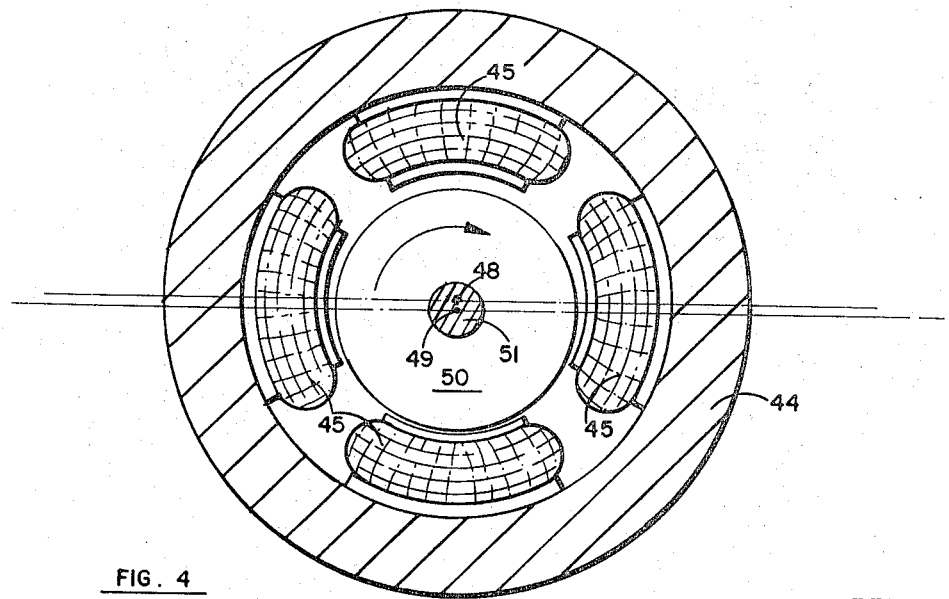
FIG. 4 is a cross-sectional view of the device illustrated in FIG. 3 taken at section B–B'.

In FIGS. 3 and 4 a second embodiment of the invention is shown. The rotor 50 is fixedly attached to shaft 51 and is supported by gas journal bearings 30 for freedom of rotation about rotor axis 49. The stator 44 fixedly houses bearings 30 and stator coils 45, such that the stator coils 45 are eccentrically mounted with respect to rotor axis 49. The stator coils provide the driving force for rotating the rotor 50 at relatively high rates of speed and they also supply the additional magnetic force for the loading of bearings 30.

Coils 45 are placed symmetrically about axis 48 which can be defined as the physical center or the electrical center of the stator 44.

With the rotor 50 rotating at high rates of speed the gaps 46 and 47 of bearings 30 will be unequal due to the unbalanced positioning of the stator coils 45 about the rotor 50. The unequal gaps 46 and 47 cause a pressure or force to be applied to shaft 51. This pressure stabilizes the shaft and raises the onset of half-frequency whirl in the bearings.

Figure 5:
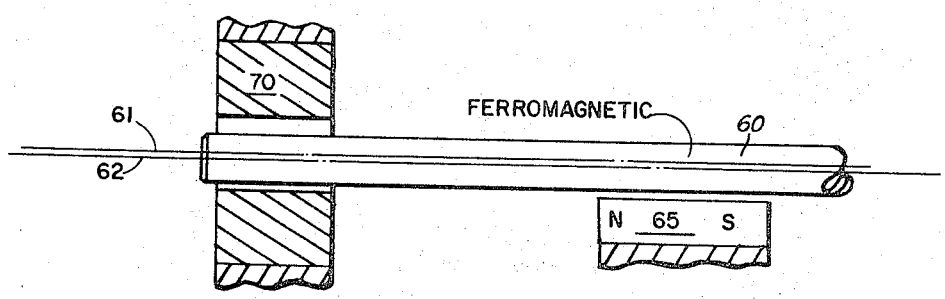
FIG. 5 is a sectional view of a third embodiment of the present invention.

In FIG. 5 a third embodiment is shown, illustrating the method of applying an external magnetic force to a ferromagnetic shaft 60 which is supported in a gas lubricated journal bearing 70 for high speed rotation about a spin axis 62. The physical center of the bearing 70 is defined by axis 61. The magnet 65 pulls the shaft 60 away from the bearing center 61.

The difference in pressure caused by the spin axis 62 not coinciding with bearing central axis 61 causes a force to be applied to shaft 60, which loads the shaft and bearing and raises the onset of half-frequency whirl.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for raising the onset of half-frequency whirl in a gas lubricated journal bearing; said apparatus comprising a shaft of substantially ferromagnetic material adapted to be rotated within said bearing at relatively high rates of speed; magnetic means positioned adjacent to said shaft to produce a force of attraction between said shaft and said magnetic means whereby the shaft is displaced a predetermined amount within said bearing.

2. Apparatus for raising the onset of half-frequency whirl in a pair of gas lubricated journal bearings; said apparatus comprising a shaft adapted to be rotated about an axis within said bearings at relatively high rates of speed; a rotor mounted fixedly to said shaft between said bearings; a stator adapted to transmit a driving force to said rotor to cause said rotor to rotate at a relatively high rate of speed, said rotor mounted eccentrically a predetermined amount with respect to said named axis to limit the movement of the axis of the rotor during rotation thereof.

3. Apparatus for raising the onset of half-frequency whirl in a pair of gas lubricated journal bearings: said apparatus comprising a shaft adapted to be rotated about an axis within said bearings at relatively high rates of speed; a rotor fixedly mounted to said shaft between said bearings; a stator symmetrically mounted about said rotor and having mounted thereto a plurality of substantially similar electro magnetics, said magnetics being adapted to transmit a driving force to said rotor to cause said rotor to rotate at a relatively high rate of speed, an additional magnet mounted at a predetermined position on said stator to produce a force between said stator and said rotor whereby said rotor is displaced within said bearings.

4. Apparatus for raising the onset of half-frequency whirl in a pair of gas lubricated journal bearings; said apparatus comprising in combination a pair of cylindrical stator structures, each having a plurality of substantially similar electro-magnets, said magnets being adapted to transmit a driving force; an additional magnet mounted to each of said stators at a predetermined point to supply an additional force; a shaft fixedly mounted between said stator structures; a bearing adapted to being rotated about said shaft at relatively high rates of speed; a rotor having a complementary structure with respect to said stator, fixedly mounted to said bearing and adapted to being rotated by said driving force at relatively high rates of speed, said additional force acting on said rotor so as to cause a pressure difference between points in said bearing so as to raise the onset of half-frequency whirl.

References Cited

UNITED STATES PATENTS 3,048,043  8/1962  Slater et al. _____ 308—9

MILTON O. HIRSHFIELD, *Primary Examiner.*

L. L. SMITH, *Assistant Examiner.*